No. 671,788. Patented Apr. 9, 1901.
M. BACH.
ICE CREAM MOLD AND DIPPER.
(Application filed Jan. 16, 1900.)
(No Model.)
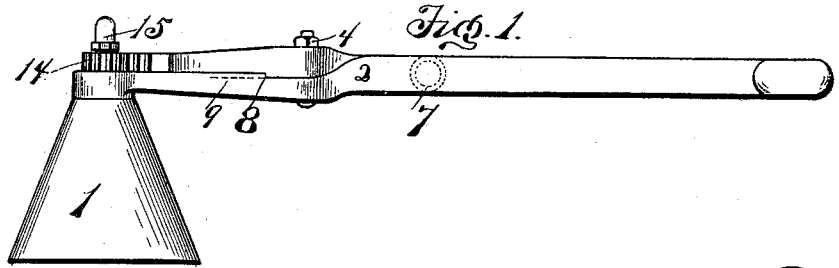
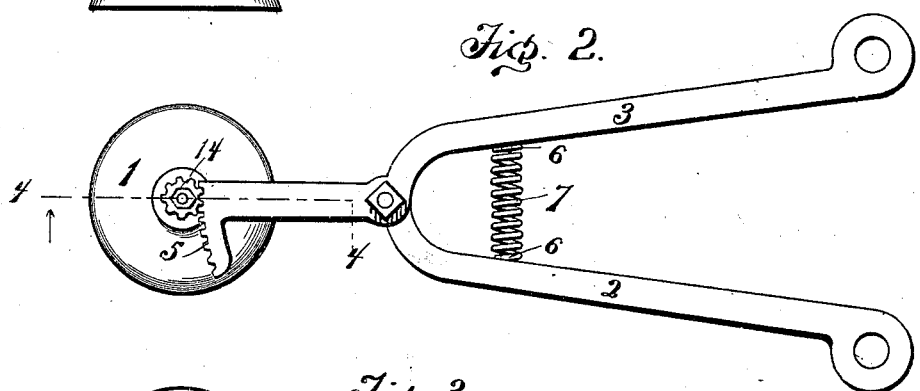
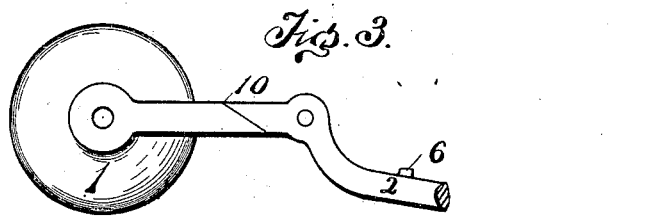
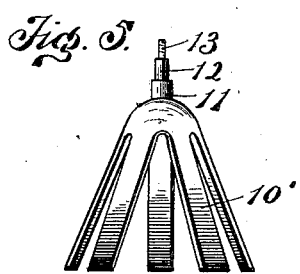
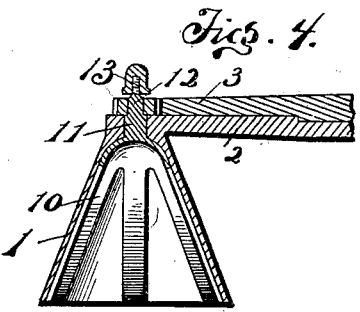
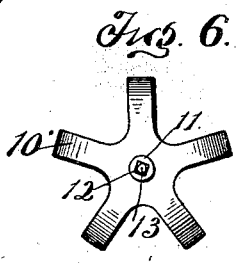
Witnesses
E. W. Hart
H. H. Simms
Inventor
M. Bach
By H. C. Evert
Attorneys
THE NORRIS PETERS CO., PHOTO-LITHO., WASHINGTON, D. C.

UNITED STATES PATENT OFFICE.

MAXIMILIAN BACH, OF PITTSBURG, PENNSYLVANIA.

ICE-CREAM MOLD AND DIPPER.

SPECIFICATION forming part of Letters Patent No. 671,788, dated April 9, 1901.

Application filed January 16, 1900. Serial No. 1,658. (No model.)

*To all whom it may concern:*

Be it known that I, MAXIMILIAN BACH, a citizen of the United States of America, residing at Pittsburg, in the county of Allegheny and State of Pennsylvania, have invented certain new and useful Improvements in Ice-Cream Molds and Dippers, of which the following is a specification, reference being had therein to the accompanying drawings.

My invention relates to certain new and useful improvements in ice-cream molds and dippers, and has for its object the provision of new and novel means whereby it will require but one hand to dip the cream from the freezer or other receptacle containing the same and remove from the mold or dipper, while in the ordinary construction both hands are required, one to hold the mold or dipper and the other to turn the cutters employed for removing the cream from the sides of the mold.

The invention has for one object to construct an ice-cream dipper of this class wherein all the parts may be easily removed and cleaned in case the cream should sour or when it becomes necessary to clean the parts; furthermore, to construct a dipper in such a novel manner that all the parts may be quickly assembled and properly adjusted in position when the dipper has been cleaned.

A still further object of my invention is to construct a dipper of this class that will be extremely simple in its construction, strong, durable, and efficient in its operation.

With the above and other objects in view my invention finally consists in the novel combination and arrangement of parts to be hereinafter more fully described, and specifically pointed out in the claim.

In describing the invention in detail reference is had to the accompanying drawings, forming a part of this specification, and wherein like numerals of reference indicate corresponding parts throughout the several views, in which—

Figure 1 is a side elevation of my improved dipper. Fig. 2 is a top plan view thereof. Fig. 3 is a plan view of the mold and a portion of one of the handles. Fig. 4 is a vertical sectional view of the mold and the forward portion of the handles. Fig. 5 is a side elevation of the cutters and attachment. Fig. 6 is a top plan view thereof. Fig. 7 is a detail view of the gear-wheel.

Referring to the drawings by reference-numerals, 1 indicates the mold proper, having formed integral therewith one of the handles 2, and 3 represents a movable handle which is pivotally connected at 4 to the handle 2. The said handle 3 carries at its forward end a cog-rack 5. Studs 6 6 are formed on the inner faces of the handles 2 3, respectively, and serve to retain the spiral spring 7, interposed between the said handles 2 3, in position. Upon the one face of the handle 3 is provided a raised portion 8, and a corresponding recessed portion 9 is arranged in the handle 2, said recessed and raised portions being beveled, as shown at 10, the latter serving as a stop and limiting the movement of the handles. Cutters 10' are formed in the shape of a cone, the apex of said cone being provided with a shaft having a rounded portion 11, a square portion 12, and a screw-threaded end 13. When the cutters are placed within the mold, the rounded portion 11 will extend through the handle 2, the square portion 12 being adapted to receive the removable cog-wheel 14, which will mesh with the cog-rack 5, and the screw-threaded end 13 is adapted to receive a screw-threaded cap 15, the latter serving to hold the parts in their proper position.

The operation of my improved ice-cream dipper is as follows: The cream is dipped in the mold in the ordinary manner and by compressing the handle 3 the cog-wheel is rotated through the medium of the cog-rack, thereby causing the cutters to rotate and sever the cream from the sides of the mold and causing the same to be discharged upon a plate or receptacle, as the case may be.

It is thought that the many advantages of my improved ice-cream dipper will be readily apparent from the foregoing description, and a further detailed description is unnecessary.

It will be noted that various changes may be made in the details of construction without departing from the general spirit of my invention.

Having thus fully described my invention, what I claim as new, and desire to secure by Letters Patent, is—

In a mold and dipper, a conical mold having the one half 2 of the operating-handle formed integral with the apex thereof, said half 2 of the handle having a shoulder 10 formed on its upper face, a section 3 forming the other half of the operating-handle pivotally secured to the section 2 and provided on its underneath face with a shoulder to engage the shoulder 10 and limit the movement of the section 3 of the operating-handle, a cog-rack 5 formed integral with the inner end of the section 3 of the operating-handle, a removable bolt for pivotally securing the section 3 to the section 2, and a coil-spring interposed between the sections of the handle to hold the section 3 normally extended, combined with a series of cutters arranged within the mold in substantially a cone-shaped manner, a shaft formed integral with the upper end of said cutters and having a rounded portion which is journaled in the apex of the mold, said shaft having a squared portion above the rounded portion and terminating in a threaded end, a cog mounted on said squared portion and adapted to mesh with the cog-rack of the handle 3 whereby motion is imparted to the cutter when the handle 3 is operated, and a nut mounted on said threaded end of the shaft for securing said cog in position, all combined and operating substantially as described and for the purpose set forth.

In testimony whereof I affix my signature in the presence of two witnesses.

MAXIMILIAN BACH.

Witnesses:
 JOHN NOLAND,
 E. W. ARTHUR.